Jan. 30, 1940.   M. E. FONKEN   2,188,536
APPARATUS FOR TWISTING DOUGH
Filed Feb. 2, 1939   4 Sheets-Sheet 1
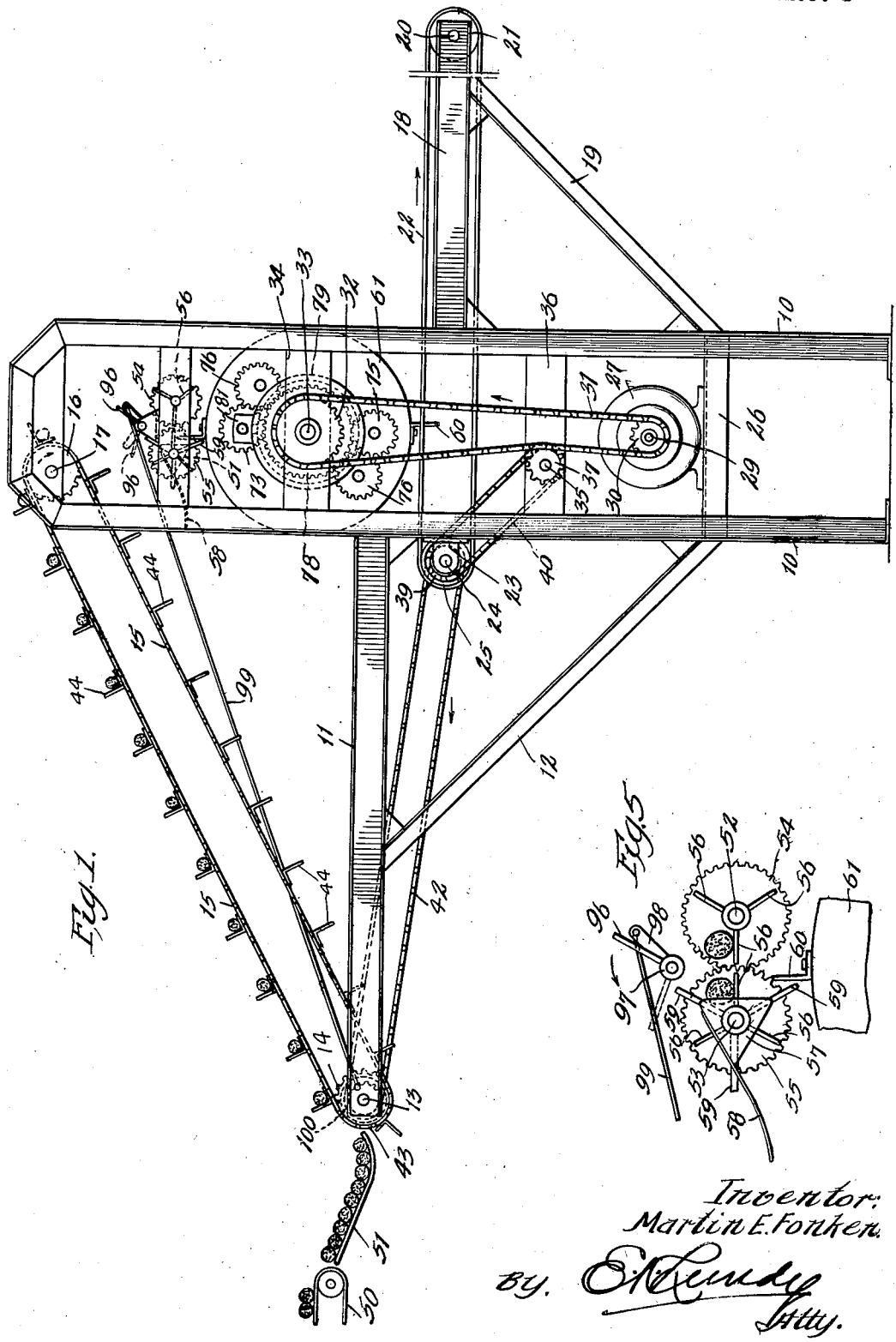
Inventor:
Martin E. Fonken
By
Atty.

Jan. 30, 1940.   M. E. FONKEN   2,188,536
APPARATUS FOR TWISTING DOUGH
Filed Feb. 2, 1939    4 Sheets-Sheet 2
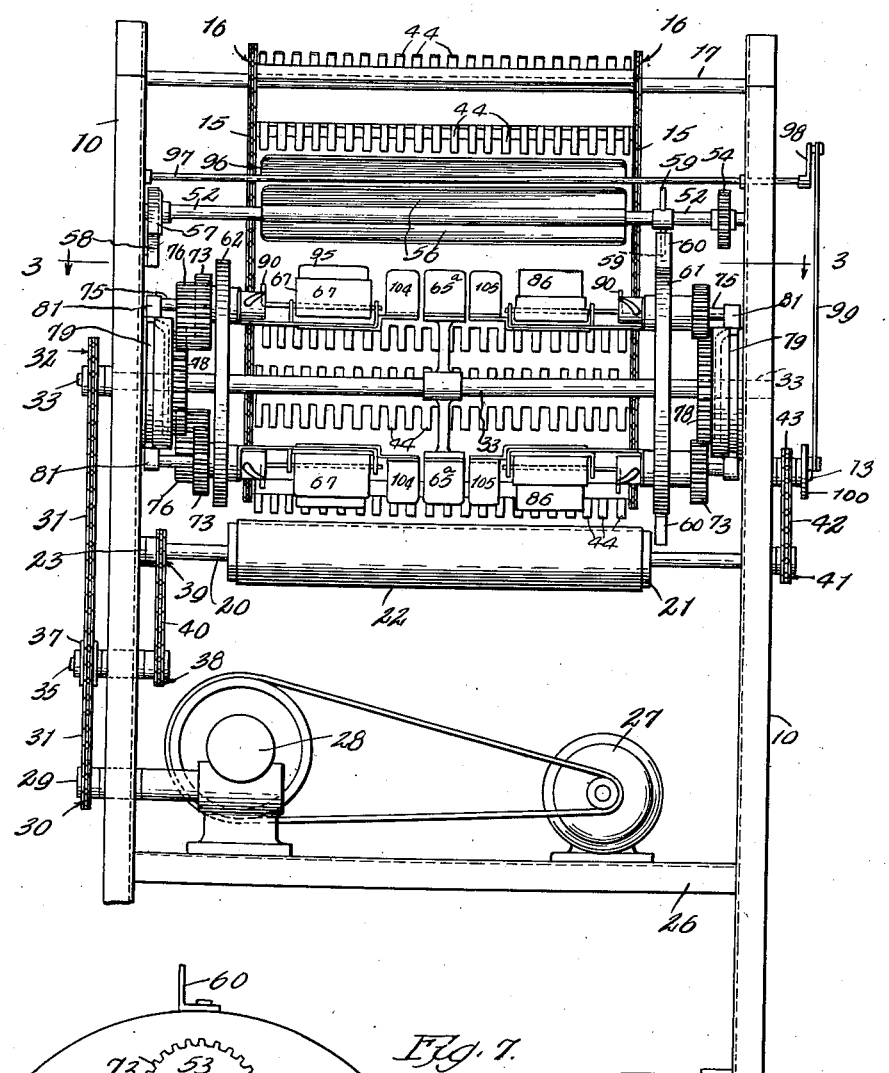
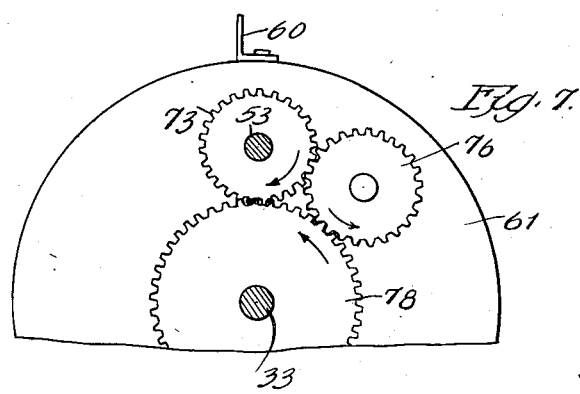

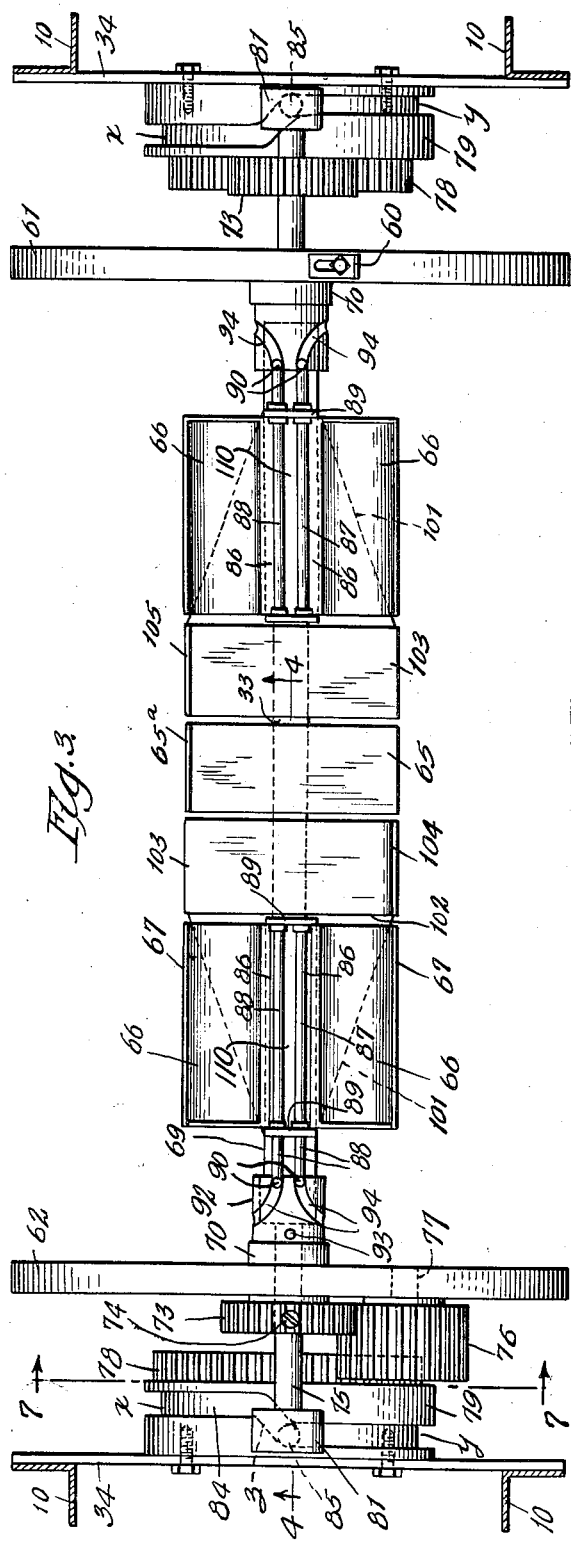

Jan. 30, 1940.　　　M. E. FONKEN　　　2,188,536
APPARATUS FOR TWISTING DOUGH
Filed Feb. 2, 1939　　　4 Sheets-Sheet 4
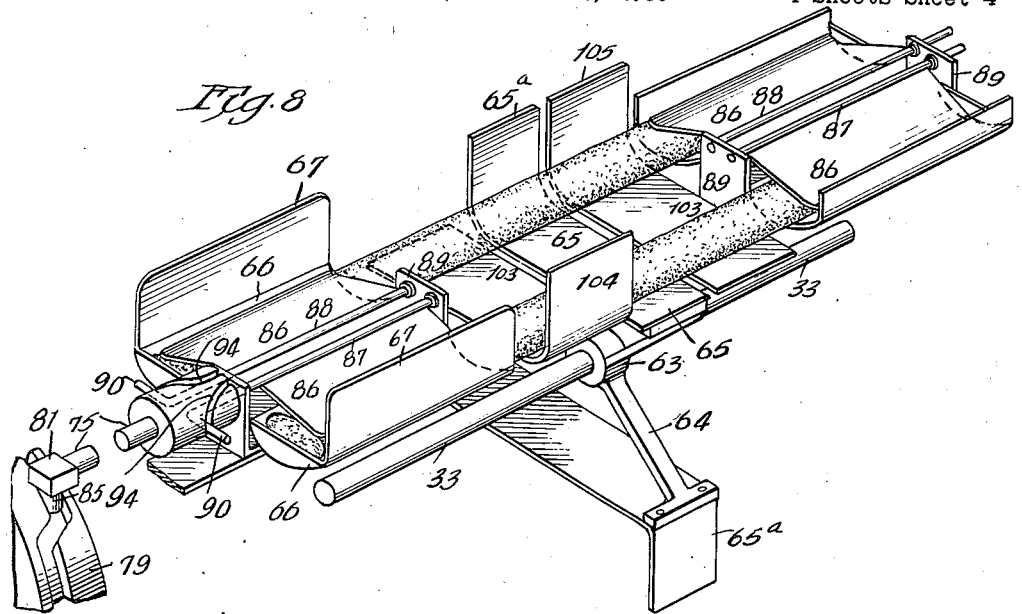
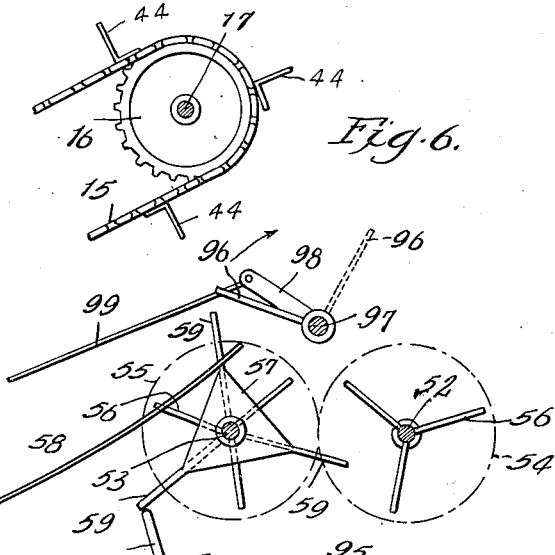
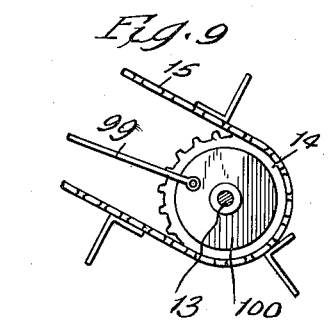
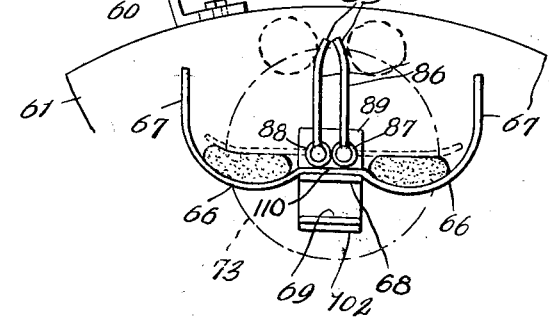
Inventor:
Martin E. Fonken.
By
Atty.

Patented Jan. 30, 1940

2,188,536

UNITED STATES PATENT OFFICE 2,188,536

APPARATUS FOR TWISTING DOUGH

Martin E. Fonken, Beloit, Wis., assignor of one-half to L. E. Caster, Rockford, Ill.

Application February 2, 1939, Serial No. 254,262

16 Claims. (Cl. 107—8)

My present invention relates to dough handling apparatus and it has particular reference to an apparatus for twisting strips or lumps of dough to form the same into dough-loaves prior to subjecting the dough to the "proofing" stage preparatory to the baking of bread.

The apparatus which I have invented is adapted to receive a plurality of dough strips, preferably in pairs, and impart a twist to these strips, and then deposit the twisted strips upon a traveler which conveys them from the apparatus. The steps just mentioned are performed by my apparatus in an entirely automatic manner and with considerable speed.

An object of my invention resides in the provision of an apparatus of the kind described that is novel in construction, and which is effective and dependable in operation. Also it is one of the objects of my invention to provide a dough handling apparatus of the character contemplated herein that is entirely automatic in its mode of operation and which requires practically no attention during its operation of twisting the dough-strips. The apparatus is made of simple and sturdy parts that will not readily get out of order, and it is economical to manufacture so that it may be sold for a reasonable retail price.

Other objects and advantages of my invention will be apparent to persons skilled in the art after the nature of the apparatus is understood from the following disclosure. My invention embodies substantially the novel construction, combination, and arrangement of the parts that are hereinafter fully described and illustrated in the accompanying drawings, and as finally pointed out in the appended claims.

My invention is herein shown in a practical or typical embodiment, but this is not to be taken as limiting the scope of the claims thereto.

In the drawings:

Figure 1 is a vertical side elevation of my apparatus for twisting dough, parts of the mechanism schematically shown.

Figure 2 is a vertical side elevation looking toward the apparatus at the right side of Figure 1, or at the discharge side of the apparatus.

Figure 3 is a plan on the horizontal plane designated as 3—3 on Figure 2 looking downward and with some of the lower parts omitted for clearness, the proportions being enlarged.

Figure 4 is a vertical section on line 4—4 of Figure 3 and slightly enlarged.

Figure 5 is a fragmental detail of a portion of the feeding mechanism above the twisting device.

Figure 6 is a graphic diagram showing the timer, the feeder, and the dough holders in co-ordinated positions.

Figure 7 is a view in elevation showing one of the gear units in detail, the view being on the plane of line 7—7 in Figure 3.

Figure 8 is a schematic perspective to graphically illustrate the twisting devices.

Figure 9 is an elevation of the structure at the receiving end of the apparatus for operating the feeder switch, and viewed from the side opposite that shown in Figure 1.

The drawings are more or less schematic, and in different views the same reference characters are used to identify like parts wherever they appear.

The mechanism is mounted in a suitable frame which consists of upright standards 10, 10, that extend the height of the apparatus and are adapted to support the various instrumentalities of the twisting mechanism as well as the feeding and discharging conveyors. Slightly above midheight there are horizontal arms 11 that project from the rear of the upright frame and are braced by oblique struts 12 and a rotatable, horizontal shaft 13 extends between the ends of the arms and has its ends journaled in the end outer portions of said arms. The shaft 13 has sprockets 14 secured upon it and an endless chain conveyor 15 passes around said sprockets. This conveyor 15 extends obliquely upward to the top of the frame-work where it passes around other sprockets 16 mounted on a rotatable shaft 17 extending horizontally across the frame-work and journaled in a cross piece of the frame. This conveyor 15 is adapted to pick up the dough-strips from the feed-line and carry them to the top of the apparatus where these dough-strips are discharged and deposited in a suitable feeder device that is intermittently operated.

Other arms 18 project from the side of the frame-work opposite the arms 11 and are braced by oblique struts 19, and adjacent their outer ends these arms support and journal a rotatable shaft 20. A roller 21 is secured to and rotates with the shaft 20 and an endless apron 22 passes around this roller. The frame-work is provided with journal blocks 23 on the side thereof below the inner ends of the arms 11. These blocks have a shaft 24 journaled in them and intermediate its ends this shaft has a roller 25 secured to it around which the adjacent portion of apron 22 passes. This apron extends through the midportion of the frame-work and beyond the apparatus, and it is adapted to convey the dough-strips away from the apparatus after these strips have been twisted. Below the apron 22 there is a horizontal support 26 upon which a suitable electric motor 27 is anchored and this motor has its spindle connected with a suitable speed-reducer 28 that its also mounted on the support 26. The shaft 29 of the speed-reducer projects beyond the frame-work where it is secured to a sprocket 30 that engages a main drive chain 31. This drive chain extends upwardly and engages the large sprocket 32 carried upon the main shaft 33 of the twisting mechanism. This main shaft 33 is horizontally disposed and has its ends journaled in cross pieces 34 extending between the uprights 10 of the frame-work. Intermediate the main drive shaft or speed-reducer spindle 29 and the main shaft 32 there is a short jack-shaft 35 that is journaled in a cross-piece 36 on one side of the frame-work above the drive-shaft 29. This shaft has an idler sprocket 37 secured to its outer end and has a transmission sprocket 38 secured to its inner end. The shaft 24 hereinbefore mentioned has a driven sprocket 39 secured to its adjacent end and it is engaged by a chain 40 connecting said sprocket and with the jack-shaft sprocket 38. In this manner the apron 22 is moved in the proper direction to convey the twisted dough-strips away from the mechanism. The other end of the shaft 24 extends beyond its bearing, outside the frame-work and it is operatively connected, by its sprocket 41 and a long chain 42, to the shaft 13 by means of a sprocket 43 secured to an extended end of said shaft 13. In this manner the speed of the discharge apron 22 and the feeding conveyor 15 are more or less synchronized.

The conveyor 15 is provided with a plurality of lateral fingers which are operated to pick up the dough-strips. These fingers are arranged in rows and the rows are equidistantly spaced from each other, and they comprise a row of upstanding fingers 44 on the edges of elongated plates 45 that are disposed transversely across the conveyor and have their ends secured to the chains 15. The dough-strips after leaving the divider mechanism (not shown) are deposited upon a traveling apron 50 that discharges these strips upon an inclined and slitted receiving chute 51 at the end of the apron, said chute being formed with an upturned outer portion disposed near the lower end of the conveyor 15. The slits in the receiving chute are spaced apart the same distance as the fingers 44 in the rows on the conveyor and when said conveyor moves around the sprockets 14 the fingers 44 successively pick up the dough-strips. Upon reaching the top of the apparatus the dough-strips are successively discharged from the conveyor 15 when the chains travel over the sprockets 16 and gravitate to a feeder and timer that is adapted to deposit a pair of strips in the twister devices.

Below the discharge portion of conveyor 15 there is an oscillating switch plate 96 secured to a rock-shaft 97 that is journaled at its end in the frame-work, and at one end said rock-shaft has a rocker arm 98 secured to it. An elongated rod 99 connects the outer end of arm 98 to a rotating circular plate 100 that is secured to the outer end of the conveyor shaft 13 to rotate therewith and move the switch plate to the limits of its movement. In the position shown in Figure 6 the switch plate receives a dough-strip and it is then moved by the rotation of the circular plate 100 to the dotted position, during which movement the strip leaves the switch plate and is deposited on a feed plate at the right side of the axis of the rocker-shaft 97. In this latter position of the switch plate when the next strip reaches said plate this next strip will be directed to the other feed plate at the left because of the return movement of the switch plate away from the dotted position.

The feeder and timer is shown somewhat in detail in Figures 5 and 6, and comprises two intermittently rotated shafts 52 and 53 that are journaled in horizontal cross-pieces 54 of the framework, and at their ends these shafts have the respective pinions 54 and 55 secured to them. Between their bearings these shafts have radiating feed plates 56 that are adapted to pause in a horizontal plane while they are receiving a pair of dough-strips. The shafts 52 and 53 are adapted to be rotated simultaneous to each other through the medium of the pinions, and their movements are synchronized with the cycle of the twisting mechanism by means of devices that are actuated by a portion of the twisting mechanism. Beyond the ends of plates 56 a triangular cam piece 57 is anchored on one of the shafts, preferably shaft 53 and a heavy leaf-spring 58, suitably secured at on end to the framework, has its free end bearing down upon the edge of said cam piece. A collar is secured to the shaft 53 and it is provided with radial arms 59 that are disposed in a manner so that they are between the planes of the radial plates 56. Lugs or detents 60 are adjustably secured to a large rotatable disk 61, preferably on the edge thereof and preferably diametrically opposite each other so that they will engage the arms 59 in successive order to rotate the feeder device in synchronized relation to the travel of the twister devices. The disk 61 and its companion disk 62 are secured to the main drive-shaft 33 of the twisting apparatus and are rotated with said shaft during the operation of the apparatus. These disks rotate in the direction as shown in Figure 1 by the arrow and as each detent 60 engages one of the arms 59 the shaft 53 will be rotated, which in turn, by means of the gears 55 and 54 will correspondingly rotate the other shaft 52 and its radiating feeder plates. The detents 60 move an arm of the device more than half the space between two arms so that an apex of the triangular cam 57 will be moved beyond dead-center with relation to the spring 58 and said spring, pressing against the cam apex will move the cam in a rotative manner until the spring has again engaged the next flat face of the cam. In this position the spring will maintain the shafts and the radiating feeder plates in position until the next pair of dough-strips is discharged from the fingers on the conveyor 15.

From the feed mechanism just described the dough-strips gravitate to suitable receiving pans that form a part of the twisting mechanism and which, during the cycle of operation are momentarily below and in vertical alinement with the radiating feed plates which have just shed the two strips of dough.

The disks 61 and 62 on shaft 33 form a portion of a rotatable frame upon which the twisting instrumentalities are mounted, which latter are adapted to perform two twisting operations during each revolution of the frame. It will be understood the structures may be multiplied and their proportions changed to adapt the apparatus for completing more than two twisting operations during a revolution. Intermediate the disks there is a platform on the frame that consists of a central hub 63 secured to shaft 33 and from which diagonal arms 64 project in a radial direction to support opposite disposed upper and lower plates 65 having trailing lateral flanges 65a. These plates provide intermediate platforms or tables upon which portions of the two dough-strips are deposited from the feeder. The lengths of these platforms, which are disposed in a direction transverse to the rotational axis of the frame structure and shaft 33, are much less than the length of the dough-strips in order that the end portions of the strips will extend beyond said platforms and be disposed in suitable receptacles or trays 66 that are supported from the disks 61 and 62 to travel therewith. These trays, as will later be seen, are also adapted for bodily rotation with respect to their supporting disks. The trays are preferably metal sheets formed with shallow concave portions disposed side by side and having tall upstanding outer margins 67. The horizontal connecting web between the two trays is secured to a U-shaped bracket 68 forming portions of a hanger 69 that connects the trays to one of the disks, 61 and 62. As clearly shown in Figure 2 of the drawings, there are four pairs of trays 66 on the disks, that are arranged so that there is a pair of trays on each side of the lower platform and another pair of trays on each side of the upper platform.

For the purpose of avoiding confusion, one pair of trays, and the associated mechanism is described, having particular reference to Figure 4 which details the structure at the left in Figure 3, but which is substantially a duplicate of the other three structures. The hanger 69 projects laterally in a horizontal direction from the disk 62 near the edge thereof and has a collar 70 that is mounted upon the adjacent projecting end of a bushing 71 disposed transversely through the disk, the opposite end of the bushing beyond the disk being provided with an enlargement 72 to receive the hub of a pinion 73 that is anchored to it by set-screw 74. A reciprocable plunger rod 75 is movable longitudinally in said bushing and projects a distance beyond each end thereof and also through and beyond the pinion 73. The means for rotating the pinion 73 comprises an idle pinion 76 rotatably mounted on a stud 77 (Fig. 3) secured on the disk 62 and projecting from its outer face, said idler being in mesh with pinion 73 and with a large stationary gear 78 that is secured to the adjacent inner face of a cam disk 79 that is anchored on the cross-piece 34 of the support or frame-work of the apparatus. When the movable frame on main shaft 33 is rotated, the disk 62 which is a part of this frame, will rotate causing the idler 76 to transmit rotative motion to pinion 73 so that the parts connected to this pinion, including the plunger rod 75, the bushing 72, the hanger 69 and the trays 66, will all be rotated bodily with respect to the disk and while moving therewith. The ratio of the gearing is proportioned so that the trays 66 are given two revolutions while traveling through a cycle of the twisting operation or half revolution of the frame so that the twisted strips will be deposited by gravity upon the apron 22 when the trays reach a downward position and then be carried away from the apparatus. In the mechanism at the right-hand side of Figure 3 the intermediate idler pinion 76 is omitted in both the upper and lower devices, and the pinion 73 is meshed directly with its large gear 78. This arrangement adapts this portion of the apparatus for bodily rotation on disk 61 in directions opposite that at the other end of the rotatable frame. Thus the respective ends of the pair of dough-strips are each given two twists in opposite direction during a cycle of operation.

Provision is made for grasping and holding the end of the strips during the twisting thereof in order to retain said strip ends in their trays. This comprises oscillating members that are actuated by the plunger rod 75 at the start and finish of a cycle of operation. The outer end of the plunger projects across the edge of the stationary cam 79 and has a reduced portion 80 adapted for free rotative movement in a block 81 that is horizontally bored to receive it and which is retained thereon by a collar 82 secured to the end of the plunger. The block has a stud 83 projecting from its under side into the cam-groove 84 in the edge of the cam disk 79, and in order to reduce friction and increase ease of operation, a roller 85 is rotatably journaled on the stud for operation in the cam-groove. As seen, approximately half of the cam-groove is in the portion of the edge of the cam disk 79 that is next the large gear 78 and is designated as $x$, while the other half of the groove designated as $y$ is in the portion of the disk edge that is remote to the gear 78, the ends of these portions of the groove being connected by oblique portions designated as $z$. Thus, when the main shaft 33 rotates the frame, the plunger is moved inwardly towards the trays at the beginning of a cycle and remains in this position during half a revolution of the frame whereupon the plunger is moved outwardly away from the trays where it remains until the start of another twisting cycle.

The oscillating members hereinbefore referred to embody metal plates 86 of rectangular outline that have rolled edges 87 tightly surrounding rods 88 that are journaled in upstanding flanges 89 on the hanger 69 and function as rockers for the plates. The flanges 89 are disposed at the ends of the web 110 that connects the trays 66 and the rocker rods extend towards the plunger and have their ends bent to provide lateral fingers 90 through the medium of which said rods and plates are rocked by the reciprocating movement of the plunger. The adjacent extended end of the plunger enters the reduced bore 91 of and supports a tubular head 92 that is open at its end nearest the trays, and said head is secured to the plunger by a transverse pin 93 or in any other suitable manner. The head has helically shaped cam slots 94 that open out through the end near the trays where the entering ends or mouths of these cam slots are alongside each other as shown in Figure 3. From their mouths the cam slots extend in opposite directions away from each other to a location where their inner ends are diametrically opposite each other. The rocker fingers 90 are engaged in these cam slots 94 and when they are in their upright positions as shown in Figures 3 and 4 the strip holding plates also are upright and have been moved away from their respective trays. When the stud 83 and its roller 85 enter the oblique portion of the cam groove 84, during rotation of the disk 62 of the frame, the plunger will be moved inwardly towards the trays. This causes the helical cam-slots 94 in the plunger head to move the ends of the lateral fingers 90 away from each other and correspondingly move the rockers 88 so that the strip holding plates 86 are swung downward across the trays, substantially in the manner shown in Figure 8. In this position these plates will be in firm contact with and press upon the ends of the dough-strips that were deposited in the trays just prior to the folding-down movement of the plates.

The free margins of the holder plates 86 are flared as at 95 for the purpose of positioning these edges close together during the step of depositing the strips in the trays from the feeder and timer. As shown schematically in Figure 6 the free edges of the plates when momentarily opened for depositing the strips in the trays will be directly below the center line of the feeder as defined by an imaginary line between the edges of the radiating feed plates 56 when they are at rest. The holder plates remain engaged with the ends of the dough strips during the twisting movement of the trays on the disk 62 while said trays are traveling with the disk from their upper or receiving position to their lower or discharging position. When the frame has made a half revolution the trays will have reached their lowermost position immediately above the apron 22.

Suitable extensions for the trays 66 are provided to bridge the spaces between the inner free ends of said trays and the adjacent sides of the platforms 65. These extensions embody tapered anchoring members 101 that are disposed under and are secured to the hangers 69. The metal sheets from which these extensions are fabricated are shouldered or stepped upward a slight distance as at 102 at the outer ends of the hangers and then are disposed horizontally to provide flat reaches 103 that project to the edges of the platforms 65. The leading edges of these reaches at one side of the platforms have upright flanges or retainer walls 104 while the trailing edges of the reaches at the other side of the platforms have similar retainer walls 105. These extensions and their retainers assist in maintaining the rotative movement of the twister trays with respect to the platforms.

It will be understood there are trays and their cooperating structures at both sides of the platform 65 as shown in Figure 8, and these instrumentalities are duplicated at both ends of the other platform. All of these elements, including the platforms, rotate with the disks 61 and 62 that form a portion of a rotatable frame on which the various parts are mounted.

What I claim is:

1. A twisting apparatus embodying a rotatable frame; a receptacle carried by and movable with said frame, said receptacle adapted to receive a plurality of strips; means for holding end portions of the strips; and means for bodily rotating said receptacle and certain of said holding means with respect to said frame during rotation of said frame.

2. A twisting apparatus embodying a rotatable frame; strip receptacles movable with said frame and spaced from each other in the direction of the axis of rotation of said frame; a strip holder cooperable with each receptacle; and means for bodily rotating a receptacle and holder with respect to the other receptacle and holder and also with respect to said frame.

3. A twisting apparatus embodying a platform rotatable upon a horizontal axis and adapted to support strips of material intermediate the ends of the latter; a frame rotatable with said platform; rotatable means on said frame disposed beyond said platform adapted to engage the ends of the strips; and means for bodily rotating said strip-engaging means upon its own axis with respect to said platform during rotation of said frame.

4. A twisting apparatus embodying a rotatable frame; a platform thereon adapted to receive strips of material, the strips adapted to project beyond the ends of said platform; and rotatable means on said frame to engage the projecting ends of the strips, said means adapted for bodily rotation upon its own axis independent of the frame, whereby to twist the strips during rotative movement of said frame.

5. A twisting apparatus embodying a rotatable frame; a platform thereon adapted to receive strips of material, the ends of the strips adapted to project beyond said platform; and twister devices rotatably mounted for independent bodily movement at the ends of said platform, said devices provided with intermittently operated means adapted to engage the strips during the bodily rotation of said twister devices.

6. A twisting apparatus embodying a rotatable frame; rotatable oppositely disposed strip holding means mounted on said frame for rotation therewith, said holding means also adapted for rotation on their own axes with respect to said frame; and strip supporting means interposed between said strip holding means.

7. A twisting apparatus embodying a rotatable frame; a platform on said frame adapted to support the strips intermediate the ends of the latter; and rotatable twister devices movably mounted on said frame, said devices adapted to grasp the ends of the strips which are disposed beyond the platform, said twister devices also adapted to be rotated on their own axes whereby to twist said strips during rotation of said frame.

8. A twisting apparatus embodying a rotatable frame; trays mounted thereon for rotation therewith and with respect thereto, said trays adapted to receive end portion of the strips; oscillating plates movable toward and from said trays to engage and disengage the ends of the strips; means for rotating said trays independent of said frame; and means for actuating said plates.

9. A twisting apparatus embodying a rotatable frame; longitudinally spaced strip-receiving trays mounted on said frame for rotation therewith and also with respect thereto; grippers adapted for coaction with said trays for retaining strips therein; plungers reciprocably mounted on said frame; and cam-elements on said plungers, said grippers having portions engaged with said cam-elements whereby said grippers are moved into and out of coaction with said trays.

10. A twisting apparatus embodying a rotatable frame; longitudinally spaced strip-receiving trays mounted on said frame for rotative movement therewith and also with respect thereto; grippers adapted for coaction with said trays for retaining strips therein; plungers reciprocably mounted on said frame for movement toward and from said grippers and cam-elements on said plungers adjacent said grippers, said grippers having portions engaged with said cam-elements whereby said grippers are moved into and out of coaction with said trays.

11. A twisting apparatus embodying a rotatable frame; a strip-receiving device on said frame adapted to receive end portions of a pair of strips, said device mounted on said frame for rotation therewith and also with respect thereto; means movable into and out of coaction with said device for engagement with the end portions of the strips; a plunger reciprocably mounted on said frame; cam-elements on said plungers, said means having portions engaged with said cam-elements whereby said means are moved with respect to the strip-receiving device; and means at a portion of said frame spaced from said strip-receiving device, said means adapted to receive and hold the other end portions of the strips.

12. A twisting apparatus embodying a rotatable frame; spaced devices on said frame having portions adapted to grip the end portions of a pair of strips and twist the latter in opposite directions, said devices mounted on said frame for rotation therewith and also with respect thereto; intermittently operated plungers reciprocably mounted on said frame adjacent said devices; and cam-elements on said plungers adapted to actuate the strip-gripping portions of devices.

13. A twisting device for dough strips embodying a frame rotatable upon a horizontal axis; a platform intermediate the ends of said frame adapted to support mid-portions of the strips; and twister mechanism mounted on said frame; said mechanism embodying a tray mounted at an end of said frame and movable therewith, said tray adapted to receive a plurality of strips; oscillatory gripper means coactable with said tray; holding means at the other end of said frame adapted to hold the adjacent ends of the strips; and means for rotating said tray and gripper means relative to said holding means and also bodily with respect to said frame.

14. A twisting device for dough strips embodying a frame rotatable upon a horizontal axis; a platform intermediate the ends of said frame adapted to support mid-portions of the strips, and twister mechanism mounted on said frame; said mechanism embodying a tray mounted at an end of said frame and movable therewith, said tray adapted to receive a plurality of strips, oscillatory gripper means coactable with said tray; holding means at the other end of said frame adapted to hold the adjacent ends of the strips; means for bodily rotating said tray and gripper means with respect to said frame; and other means for bodily rotating said holding means with respect to said frame and in a direction opposed to the bodily rotation of said tray.

15. A twisting apparatus for dough strips embodying a frame rotatable upon a horizontal axis; a platform intermediate the ends of said frame adapted to support mid-portions of the strips; and twister devices interposed between the ends of said frame and said platform, said twister devices embodying trays mounted at opposite ends of said frame and movable therewith; oscillatory grippers coactable with said trays; strip-supports extending between said trays and said platform and movable with said trays; and means for bodily rotating said twister devices in opposite directions relative to each other and also bodily with respect to said frame.

16. A twisting apparatus for dough strips embodying a frame rotatable upon a horizontal axis; a platform intermediate the ends of said frame adapted to support mid-portions of the strips; and twister devices interposed between the ends of said frame and said platform, said twister devices embodying trays mounted at opposite ends of said frame and movable therewith; oscillatory grippers coactable with said trays; strip-supports extending between said trays and said platform and movable with said trays; means for bodily rotating said twister devices in opposite directions relative to each other and also bodily with respect to said frame; and means for intermittently actuating said oscillatory grippers.

MARTIN E. FONKEN.